US006836708B2

(12) United States Patent
Tripathi

(10) Patent No.: US 6,836,708 B2
(45) Date of Patent: Dec. 28, 2004

(54) MONITORING OF VEHICLE HEALTH BASED ON HISTORICAL INFORMATION

(75) Inventor: Pradeep R Tripathi, Ann Arbor, MI (US)

(73) Assignee: Systech International, L.L.C., Ann Arbor, MI (US)

( * ) Notice: Subject to any disclaimer, the term of this patent is extended or adjusted under 35 U.S.C. 154(b) by 0 days.

(21) Appl. No.: 10/275,465

(22) PCT Filed: May 8, 2001

(86) PCT No.: PCT/US01/14747

§ 371 (c)(1), (2), (4) Date: Nov. 6, 2002

(87) PCT Pub. No.: WO01/86576

PCT Pub. Date: Nov. 15, 2001

(65) Prior Publication Data

US 2003/0208309 A1 Nov. 6, 2003

Related U.S. Application Data

(60) Provisional application No. 60/202,419, filed on May 8, 2000.

(51) Int. Cl.[7] .................... G06F 15/18

(52) U.S. Cl. .................... 701/29; 701/24; 701/30; 701/35; 706/12; 702/187; 340/439

(58) Field of Search .................... 701/29, 24, 30, 701/33, 35, 59; 706/12; 702/187, 179; 455/569.2, 99; 73/117.2; 340/439

(56) References Cited

U.S. PATENT DOCUMENTS

| | | | | |
|---|---|---|---|---|
| 4,602,127 A | | 7/1986 | Neely et al. | 179/2 A |
| 5,884,202 A | | 3/1999 | Arjomand | 701/29 |
| 5,916,287 A | | 6/1999 | Arjomand et al. | 701/29 |
| 6,055,468 A | | 4/2000 | Kaman et al. | 701/29 |
| 6,094,609 A | | 7/2000 | Arjomand | 701/29 |
| 6,546,378 B1 | * | 4/2003 | Cook | 706/12 |

* cited by examiner

*Primary Examiner*—Thomas C. Black
*Assistant Examiner*—Arthur D. Donnelly
(74) *Attorney, Agent, or Firm*—Van Dyke, Gardner, Linn & Burkhart, LLP

(57) ABSTRACT

A method and apparatus for detecting abnormal behaviour in a vehicle (8) with an engine having engine control module includes providing a database (20), and a vehicle analyzer (12) having a communication device (16) and an interface (14) that links the communication device (16) to a vehicle (8). Engine parameters that are retrieved through the interface (14) during driving experience are uploaded to the database (20) using the communication device (16). The database (20) analyzes the engine parameters from multiple driving experiences to establish historical data and determine normal operation of particular retrieved engine parameters based on the historical data. A vehicle (8) can be diagnosed by comparing its retrieved engine parameters with the database (20).

43 Claims, 2 Drawing Sheets

MONITORING OF VEHICLE HEALTH BASED ON HISTORICAL INFORMATION

CROSS-REFERENCE TO RELATED APPLICATION

This application claims priority from U.S. provisional patent application Ser. No. 60/202,419 filed on May 8, 2000, the disclosure of which is hereby incorporated herein by reference in its entirety.

BACKGROUND OF THE INVENTION

In the United States, automotive mechanics are not always viewed as being fully trusted and reliable. Practicality indicates that automotive mechanics typically are not fraudulent, but rather overwhelmed with the complexity of the modern computer-controlled vehicle. With hundreds of parameters dictating a vehicle's performance, it may be difficult to pinpoint the source of the problem regardless of the mechanic's skill level. There has also been decay in the number of households that perform basic maintenance to their own vehicles. The primary reason again relates to the increase in complexity of the modern vehicle.

The problem with the current approach for diagnosis and maintenance is that it is performed in a static manner. Typical diagnosis of a vehicle's performance is based on a single snap shop image of the vehicle's characteristics. Presently, adequate use of vehicle and driving mode specific historical information is not used to assist in this process.

Present diagnostic tools that interface to the vehicle computer will show various sensor data and information. However, aside from actual fault codes from the vehicle, these tools do not contain tolerances for each and every vehicle type and driving conditions for the vast available parameters. As a result, the mechanic must determine from hundreds of available parameters the potential cause of the problem. This requires extensive expertise and references to technical manuals on sensor input and output status for that vehicle type. Ultimately, vehicle maintenance and diagnosis can be complicated and costly, considering the current tools that are available.

Onboard Diagnostics, or OBD, was developed primarily for monitoring the vehicle's emissions control systems by the Engine Control Module (ECM), which will typically display a general warning to the operator when a fault is detected. It also provides a means by which a mechanic or vehicle inspector can access specific fault codes related to engine hardware that can affect emissions and engine performance. The OBD system is accessible via a standardized communications cable and a microprocessor-based device, often referred to as a scan tool, that implements a standardized communications protocol. Data from onboard sensors can be accessed at a rate of up to 50 Hz.

Prior art includes U.S. Pat. No. 5,539,638 to Keeler et al. and U.S. Pat. No. 5,625,750 to Puskorius et al. that claim the use of artificial intelligence computer systems that can be trained to predict failure of the catalytic converter and to predict certain emissions levels. Both standard OBD sensors and additional sensors are used to generate inputs into these learning algorithms. Prior systems do not attempt to establish parameters during different driving and vehicle conditions. Instead, generic broad parameters are established covering multiple vehicles and driving conditions. Prior systems also use several parameters in conjunction to predict a certain condition, such as high hydrocarbon emissions.

SUMMARY OF THE INVENTION

The federal government has mandated that all vehicles sold in the United States shall have a standardized interface to the vehicle's computer. The present invention provides a vehicle analyzer that can be embodied as a microprocessor-based hardware/software package designed to communicate with OBD (onboard diagnostics) computer systems contained in 1996 and later vehicles sold in the United States. The present invention provides a product that is useful for both the consumer and the professional.

A method of detecting abnormal engine behavior in a vehicle, according to an aspect of the invention, includes providing a database, a communication device and an interface to an engine control module and retrieving engine parameters through the interface during a driving experience and uploading the engine parameters to the database using the communication device. The method further includes analyzing the uploaded engine parameters from multiple driving experiences at the database to establish historical data and determining normal operation of particular retrieved engine parameters based on the historical data. The method further includes comparing engine parameters of a vehicle to be diagnosed with the normal operation of particular retrieved engine parameters to determine whether the vehicle to be diagnosed operates outside of the normal operation.

A method of detecting abnormal engine behavior in a vehicle, according to another aspect of the invention, includes providing a database and multiple vehicle analyzers, each of the vehicle analyzers including a communication device and an interface with an engine control module. The method further includes retrieving engine parameters for multiple vehicles that are generally the same type as each other using the multiple vehicle analyzers and uploading the retrieved engine parameters to the database. The method further includes analyzing the uploaded engine parameters from the multiple vehicles to establish historical data and determining normal operation of particular retrieved engine parameters based on the historical data. The method further includes preparing engine parameters of a vehicle generally of the same type with the normal operation of particular retrieved engine parameters to determine whether the vehicle operates outside the normal operation.

In either of the above-identified methods, the analyzing may include retrieving engine parameters over multiple driving experiences, storing the data over multiple driving experiences into the database and establishing statistical control limits for the particular engine parameters. This may further include establishing statistical control limits for particular engine parameters during various driving conditions which may include idle, steady cruise at various speeds, and various rates of acceleration and deceleration. The particular engine parameters may include critical engine parameters. The historical data may be based on engine parameters retrieved previously from the vehicle to be diagnosed.

In either of the above-identified methods, the uploading may include communicating over either an Internet or an Intranet. The communication may be via wireless communication. The uploading may include communicating over a global network and may further include providing a wireless communication device that is adapted to connect with the database over the global network. The communication device may include browser software and the interface may include an onboard diagnostic interface.

A system for detecting abnormal vehicle engine behavior, according to an aspect of the invention, includes a vehicle analyzer having a communication device and an interface that links the wireless communication device to a vehicle.

The system further includes a database system that is separate from the vehicle analyzer. The wireless communication device collects data from the vehicle through the interface scan tool while the vehicle is driven. The database system is programmed to receive data broadcast by the wireless communication device from the scan tool. The database includes normal operation of particular engine parameters based on historical data. The database system compares the collected data to the normal operation of particular engine parameters to determine normal conditions of the vehicle.

A system for detecting abnormal vehicle engine behavior, according to another aspect of the invention, includes a database and a plurality of vehicle analyzers, each including a communication device and an interface that links the communication device to a vehicle. The communication device is adapted to upload to the database engine parameters retrieved by the interface. The database is adapted to analyze the retrieved engine parameters uploaded from a plurality of vehicle analyzers to establish historical data among vehicles that are generally of the same type and to determine normal operation of particular retrieved engine parameters based on historical data. The database is further adapted to compare engine parameters of a vehicle generally of the same type with the normal operation of particular retrieved engine parameters to determine whether that vehicle operates outside of the normal operation.

Either of the above-identified systems may further include determining the normal operation of particular engine parameters from data retrieved from multiple previous driving experiences. The communication device may include a wireless communication device, such as a cellular telephone or a personal digital assistant. The wireless communication device may include a radio frequency transmitter. The vehicle analyzer may include a data port for uploading data to a computer for subsequent uploading to the database at a later time. The communication device may be adapted to operate on a global network, such as an Internet or an Intranet, and may further include browser software. The database system may establish statistical control limits for particular engine parameters during various driving conditions which may include idle, steady cruise at various speeds, and various rates of acceleration and deceleration. The particular engine parameters may include critical engine parameters.

The present invention utilizes a technique to characterize normal limits for individual engine parameters and provides a means by which to detect when said parameters begin to operate outside normal levels for certain operating conditions. While the ECM contains limits on some engine parameters, these are typically gross limits that apply to all operating conditions, and vehicle age or mileage combined. The present invention provides a much narrower tolerance of what is considered normal operation of engine parameters to facilitate diagnosis of actual and imminent engine failure. This invention, therefore, provides a means of early detection of failure of specific components.

A vehicle analyzer, according to more detailed aspects of the invention, obtains information from the vehicle's computer to track critical engine parameters and reports any problems or potential problems to the user. The vehicle analyzers pass information from a large number of vehicles to a database that uses statistical modeling to "learn" typical performance of these critical engine parameters under various driving conditions, including idle, steady cruise, accelerations, and decelerations. Once a sufficient statistical database is established, the vehicle analyzer in conjunction with the database can diagnose a vehicle under driving conditions. The operating condition, including any abnormal behavior that could indicate or eventually lead to a failure of one or more engine components, can be determined with the use of either historical or reference information. The vehicle analyzer will also translate any specific fault codes stored in the onboard computer system to useable information for the user in order to diagnose and repair the vehicle.

The vehicle analyzer and database, according to an aspect of the invention, is a system that implements a method of tracking and monitoring a vehicle's health based on historical statistical information, rather than only instantaneously accessing the vast diagnostic information available on vehicles. As a result, vehicle maintenance and diagnosis can be simplified such that the consumer has a tool that permits him or her to know when something has failed or is about to fail by comparing an individual vehicle's diagnostic information with the comparable data of the same vehicle fleet. It also assists the mechanic in repairing the vehicle back to the fault-free condition. The historical parameters also serve as a reference for the effectiveness of the repair on a broad range of parameters. The vehicle analyzer is able to gather significant data and establish tighter acceptable operating parameters based on the vehicle's history that allows early detection of problems.

In addition, the vehicle analyzer can be used to assess the health of a vehicle before it is purchased. In this case, the vehicle analyzer system is used in conjunction with the database that contains data on other vehicles of the same type. This can provide a more objective analysis by the consumer prior to the purchase of a modern vehicle.

The primary advantages of this system include its low cost and early detection of problems resulting from tight tolerances. It also provides simplification of diagnosis. The invention may be used for repair verification and objective purchase analysis.

These and other objects, advantages and features of this invention will become apparent upon review of the following specification in conjunction with the drawings.

DESCRIPTION OF THE PREFERRED EMBODIMENT

Figure 1:
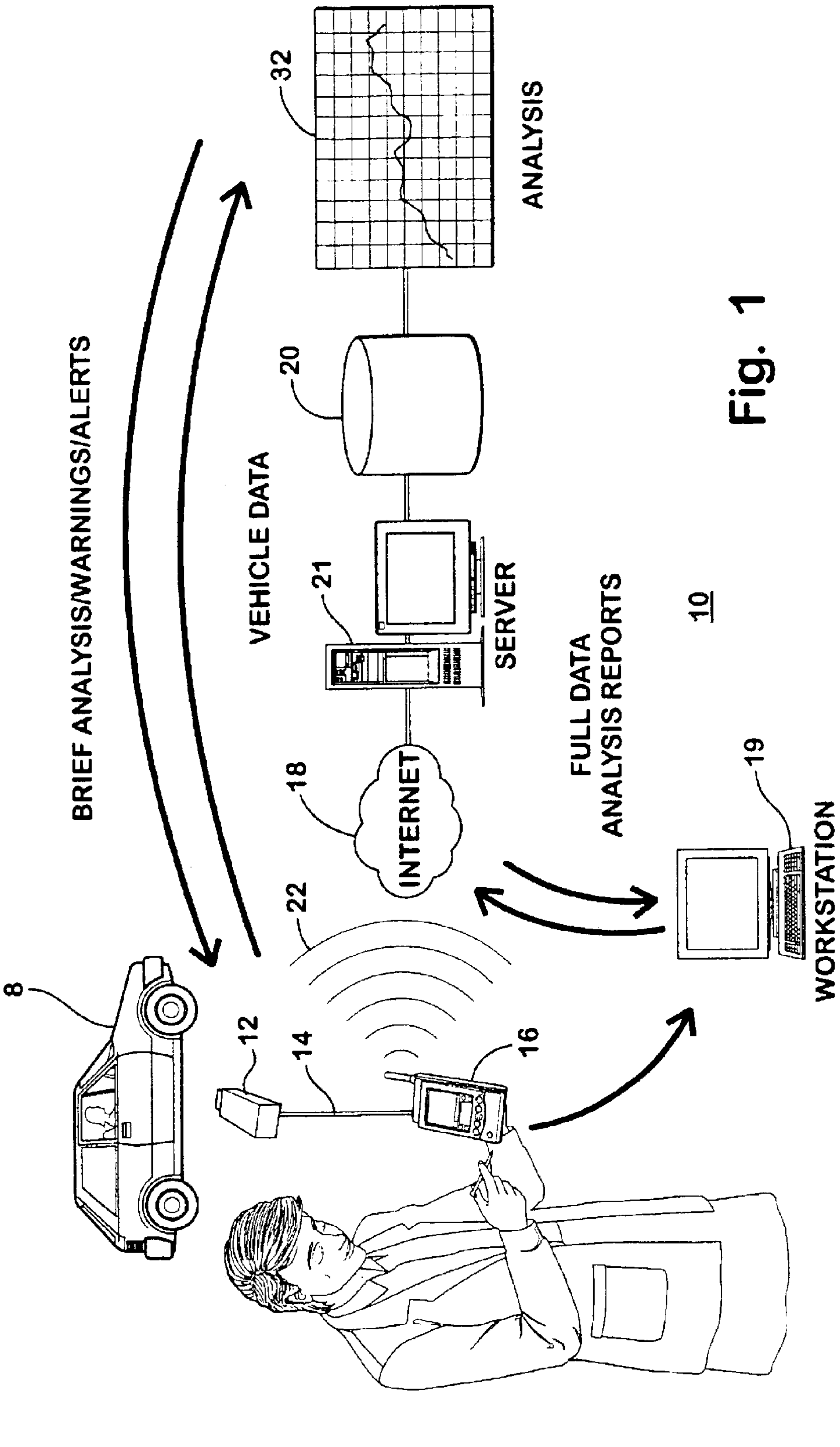
FIG. 1 is a block diagram of a system for detecting abnormal engine behavior, according to the invention.
Figure 2:
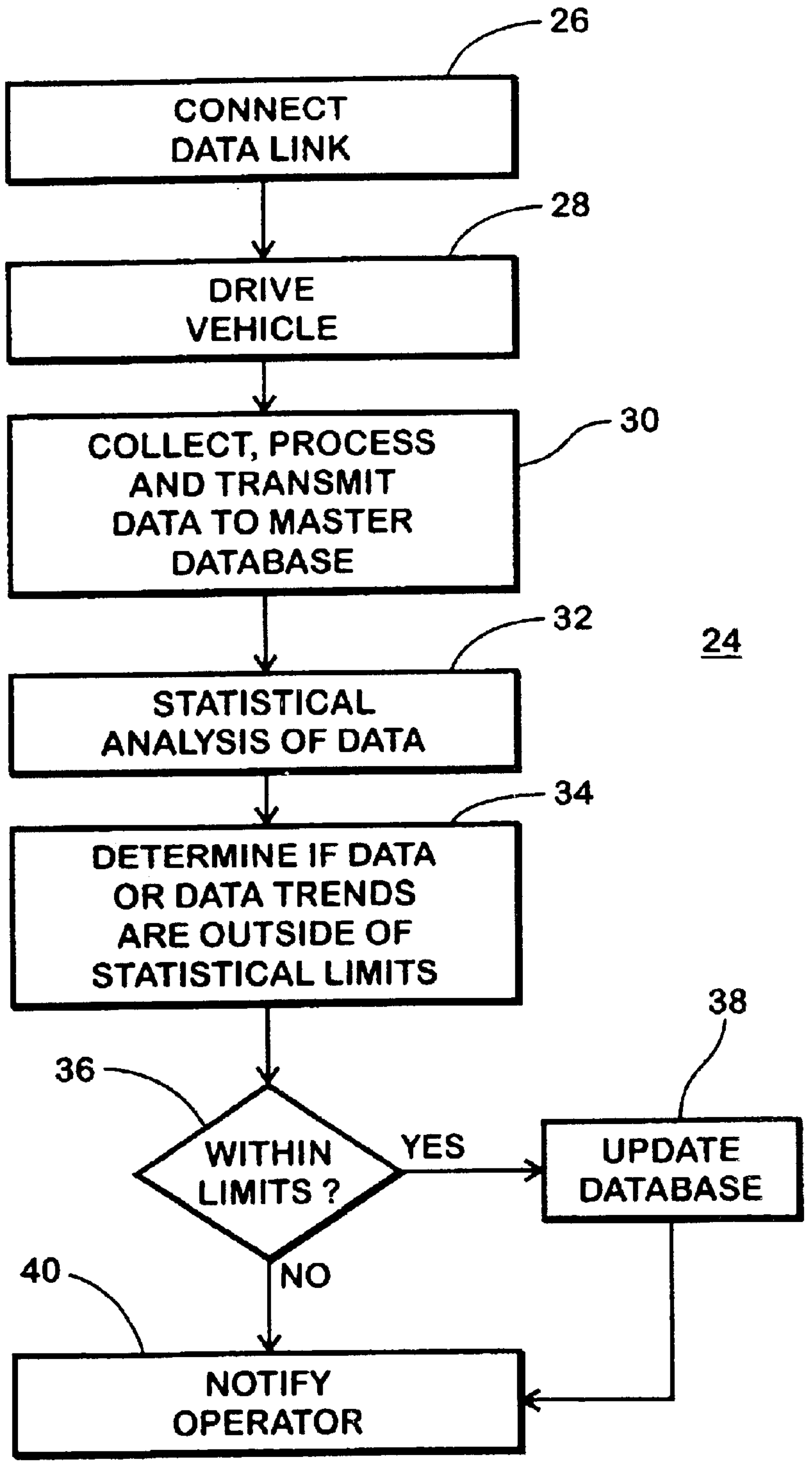
FIG. 2 is a flowchart of a method of detecting abnormal engine behavior, according to the invention.

Referring now specifically to the drawings, and the illustrative embodiments depicted therein, a system 10 for detecting abnormal engine behavior of a vehicle 8 based on historical information is provided including a vehicle analyzer, such as an OBD scan tool hardware device 12 having a connector, or data port, 14 to link to a wireless Internet ready communication device, such as a cellular telephone 16, a personal digital assistant (PDA), or the like. Wireless Internet ready phone 16 includes an Internet browser to connect, via a wireless data link 22, to a global network, such as the Internet or an Intranet 18. A master database 20 and application software are run on a computer 22 connected with Internet or Intranet 18.

In operation, system 10 is linked to vehicle 8 to collect data. Vehicle analyzer 12 interfaces with the Engine Control Module (ECM) on a vehicle via standardized communications protocol, connector and hardware that is adapted to link to the data port of wireless Internet ready phones 16. Application software allows for communication between the wireless Internet ready phone 16 and the vehicle onboard computer.

A method 34 of detecting abnormal engine behavior of vehicle 8 begins at 26 by initiating data link 22 when performing a diagnosis or to generate or maintain the personal vehicle data on a predetermined frequency. The operator will be instructed to perform regular data acquisitions at a certain time interval, so parameters can be monitored with statistical tools. While the user drives the vehicle in a normal fashion (28), the vehicle analyzer will collect, process, and transmit data (30) on critical engine components to the master database. The engine parameters that will be tracked may include, but are not limited to, exhaust gas oxygen (both upstream and downstream of the catalytic converter), mass airflow, engine coolant temperature, engine rpm, and operating controls, such as degree of spark advance and degree of exhaust gas recirculation. This data will be sampled during various driving conditions and processed in such a way as to establish a database for certain operating conditions. These conditions include idle, cruise at various speeds, and various rates of acceleration and deceleration.

System 10 analyzes the data at 32. The vehicle analyzer will use Statistical Process Control (SPC) tools and trend-modeling analysis to analyze data-based vehicle history. When the master database of information at this condition is sufficiently large, upper and lower control limits are established based on statistical analysis of the master database. This establishes normal operation of particular retrieved engine parameters. This may include the mean and standard deviation of the database.

The application software at the master database compares the retrieved engine parameter (34) and determines if there are any trends in this data or if data is outside statistical limits. This would suggest a change in the operation of the engine, which may be an early detection of some component failure. If a problem is detected (36), the master database notifies (40) the operator and suggests how to further diagnose the problem, such as by sending a message, voice or data, to the wireless Internet ready phone. This message can also be sent by E-mail, facsimile, or mail. The same process can be performed on other critical engine parameters and other operating conditions. If no problem is detected (38), the retrieved data can be used to further update the database of engine parameters.

System 10 may also analyze vehicle data based on data from vehicles of the same type and condition as the vehicle being analyzed. The vehicle analyzer may further have the ability to connect to a global network, such as the Internet or Intranet, to exchange data and information for the purpose of vehicle maintenance, diagnosis or purchase. In particular, the vehicle analyzer has the capability to connect to the Internet or an Intranet to upload vehicle data to the Internet/Intranet server system. Upon connection to the server system, the vehicle analyzer transmits all local vehicle data and information. At this time, the vehicle analyzer can request data on vehicles of the same type. Each connection increases the master database information. Data port 14 may also be connected with a computer 19 for uploading data retrieved by vehicle analyzer 12 at a later time. Computer 19 may also receive notifications (36) from database 20.

The master database may use variance analysis algorithms to perform analyses based on data from other vehicles of the same type. Data on the same vehicle type acquired from the database system may be used to compare to the consumer collected vehicle data. This will allow for a consumer to compare the sensor outputs from a properly operating vehicle to a vehicle being purchased. It also may be used to determine the source of the problem when performing vehicle diagnosis. Detailed comparisons and analyses are performed at the master database. The results can be sent and made available to the consumer in many different ways, such as wireless messaging, facsimile, E-Mail, web site, etc.

EXAMPLE

An example of the invention used to evaluate the vehicle's oxygen ($O_2$) sensor follows. Data collected on that vehicle, whether continuous or discrete, is modeled in the same manner as the $O_2$ sensor described below to achieve the most effective early detection and diagnosis. Data is gathered from the vehicle using vehicle analyzer 12 based on an Internet ready wireless device, such as an Internet ready cellular phone 16. Data is sent to the main database 20. The application software at the main database analyzes $O_2$ data. Driving conditions, such as the vehicle is warm/cold or accelerating/decelerating/cruising/idling, are determined for sets of data collected by looking at vehicle speed, engine coolant temperature, engine rpm, calculated vehicle load and much more. Data within a driving event may have different conditions from start to end, since a cold car will warm up over time. Vehicle condition can be affected by factors such as age, faulty condition, etc. For a given vehicle and given driving conditions, the vehicle analyzer evaluates $O_2$ parameters such as:

i. Time between transitions
ii. Min sensor voltage
iii. Lean to rich switch time
iv. Rich to lean switch time
v. Lean to rich threshold
vi. Rich to lean threshold
vii. High sensor voltage and low sensor voltage Acceptable and actual decay rate of a sensor are modeled to achieve the tightest tolerances established utilizing SPC modeling tools. Since data of the same type, based on same vehicle and driving condition, is available in the master database, the resultant data-set will have a normal distribution allowing hypotheses testing for significant difference by utilizing analysis of variance design and analysis.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of detecting abnormal behavior in a vehicle having an engine with an engine control module, said method comprising:

providing a database, a communication device, and an interface to a diagnostic port of an engine control module;

retrieving engine parameters from the engine control module through said interface during a driving experience and uploading the retrieved engine parameter to said database using said communication device;

analyzing the uploaded engine parameters from multiple driving experiences at said database to establish historical data and determining normal operation of particular retrieved engine parameters based on the historical data; and comparing engine parameters of a vehicle to be diagnosed with said normal operation of particular retrieved engine parameters to determine whether the vehicle to be diagnosed operates outside or the normal operation.

2. The method of detecting abnormal engine behavior of claim 1 wherein said analyzing includes retrieving engine parameter from the engine control module over multiple driving experiences, storing the data over multiple driving experiences into a database, and establishing statistical control limits for the particular engine parameters.

3. The method of detecting abnormal behavior of claim 2 including establishing statistical control limits for particular engine parameters during various driving conditions.

4. The method of detecting abnormal behavior of claim 3 wherein the various driving conditions include idle, steady cruise at various speeds, and various rates of acceleration and deceleration.

5. The method of detecting abnormal behavior an claim 1 wherein said particular engine parameters comprise critical engine parameters.

6. The method of detecting abnormal behavior in claim 1 wherein said historical data is based on engine parameters retrieved prior to said comparing from the vehicle to be diagnosed.

7. The method of detecting abnormal behavior in claim 1 wherein said uploading includes communicating over one of an Internet and an Intranet.

8. The method of detecting abnormal behavior in claim 1 wherein said uploading includes communicating via wireless communication.

9. The method of detecting abnormal behavior in claim 8 wherein said uploading includes communicating over a global network.

10. The method of detecting abnormal behavior in claim 9 wherein said uploading includes providing a wireless communication device that is adapted to connect with said database over said global network.

11. The method of detecting abnormal behavior in claim 10 wherein said communication device includes browser software.

12. The method or detecting abnormal behavior in claim 1 wherein said interface includes an onboard diagnostic interface.

13. A method of detecting abnormal behavior in a vehicle having an engine with an engine control module, said method comprising:

providing a database and multiple vehicle analyzers, each of said vehicle analyzers including a communication device and an interface to a diagnostic port of an engine control module, retrieving engine parameters from the engine control module of multiple vehicles that are generally the same type as each other using said multiple vehicle analyzers and uploading the retrieved engine parameters to said database;

analyzing the uploaded engine parameters from the multiple vehicles to establish historical data and determining normal operation of particular retrieved engine parameters based on the historical data; and comparing engine parameters of a vehicle generally of said same type with said normal operation of particular retrieved engine parameters to determine whether that vehicle operates outside of the normal operation.

14. The method of detecting abnormal behavior of claim 13 including retrieving engine parameters from the engine control modules over multiple driving experiences from said multiple vehicles.

15. The method of detecting abnormal behavior of claim 14 wherein said uploading includes communicating via wireless communication.

16. The method of detecting abnormal behavior of claim 15 wherein said uploading includes communicating over a global network.

17. The method of detecting abnormal behavior in claim 16 wherein said uploading includes providing for each of said vehicle analyzers a wireless communication device that is adapted to connect with said database over said global network.

18. The method of detecting abnormal behavior in claim 17 wherein said communication device includes browser software.

19. The method of detecting abnormal behavior in claim 13 wherein said analyzing includes retrieving engine perimeters over multiple driving experiences, storing the data over multiple driving experiences into a database, and establishing statistical control limits for the particular engine parameters.

20. The method of detecting abnormal behavior of claim 19 including establishing statistical control limits for particular engine parameters during various driving conditions.

21. The method of detecting abnormal behavior of claim 20 wherein the various driving conditions include idle, steady cruise at various speeds, and various rates of acceleration and deceleration.

22. The method of detecting abnormal behavior in claim 13 wherein said particular engine parameters comprise critical engine parameters.

23. A system for detecting abnormal vehicle engine behavior of a vehicle having an engine with an engine control module, comprising:

a vehicle analyzer comprising a communication device and an interface diagnostic scan tool that links said communication device to a diagnostic port of a vehicle engine control module;

a database system separate from said vehicle analyzer, said database system being programmed to receive data uploaded by said communication device, said database determines normal operation of particular engine parameters based on historical data;

wherein said vehicle analyzer retrieves data from the vehicle while the vehicle is driven to retrieve engine parameters and uploads the retrieved engine parameters to said database;

said database system compares the collected data to said normal operation of particular engine parameters to determine abnormal conditions of the vehicle.

24. The system for detecting abnormal vehicle engine behavior of claim 23 wherein said database determines normal operation of particular engine parameters from dale retrieved from the vehicle being diagnosed over multiple previous driving experiences.

25. The system for detecting abnormal vehicle engine behavior of claim 23 wherein said communication device comprises a wireless communication device.

26. The system for detecting abnormal vehicle engine behavior of claim 25 wherein said wireless communication device comprises one of a cellular telephone and a personal digital assistant.

27. The system for detecting abnormal vehicle engine behavior of claim 25 wherein said wireless communication device comprises a radio frequency transmitter.

28. The system for detecting abnormal vehicle engine behavior of claim 23 wherein said vehicle analyzer includes a data port for uploading data to a computer for subsequent uploading to said database.

29. The system for detecting abnormal vehicle engine behavior of claim 23 wherein said communication device is adapted to operate on a global network.

30. The system for detecting abnormal vehicle engine behavior of claim 29 wherein said communication device includes browser software.

31. The system for detecting abnormal vehicle engine behavior of claim 23 wherein said database system establishes statistical control limits for particular engine parameters during various driving conditions.

32. The system for detecting abnormal behavior of claim 31 wherein the various driving conditions include idle, steady cruise at various speeds, and various rates of acceleration and deceleration.

33. The system for detecting abnormal behavior in claim 23 wherein said particular engine parameters comprise critical engine parameters.

34. A system for detecting abnormal vehicle engine behavior of a vehicle having an engine with an engine control module comprising:

a database and a plurality of vehicle analyzers, each including a communication device and an interface diagnostic scan tool that links that communication device to a diagnostic port of a vehicle engine control module, wherein said communication device is adapted to upload to said database engine parameters retrieved by said interface diagnostic scan tool; and said database is adapted to analyze the retrieved engine parameter uploaded from said plurality of vehicle analyzers to establish historical data among vehicles that are generally of the same type and to determine normal operation of particular retrieved engine parameters based on historical data;

wherein said database is further adapted to compare engine parameters of a vehicle generally of said same type with said normal operation of particular retrieved engine parameters to determine whether that vehicle operates outside of the normal operation.

35. The system for detecting abnormal vehicle engine behavior of claim 34 wherein said communication device comprises a wireless communication device.

36. The system for detecting abnormal vehicle engine behavior of claim 35 wherein said wireless communication device comprises one of a cellular telephone and a personal digital assistant.

37. The system for detecting abnormal vehicle engine behavior of claim 35 wherein said wireless communication device comprises a radio frequency transmitter.

38. The system for detecting abnormal vehicle engine behavior of claim 34 wherein said vehicle analyzer includes a data port for uploading data to a computer for subsequent uploading to said database.

39. The system for detecting abnormal vehicle engine behavior of claim 34 wherein said communication device is adapted to operate on a global network.

40. The system for detecting abnormal vehicle engine behavior of claim 39 wherein said communication device includes browser software.

41. The system for detecting abnormal vehicle engine behavior of claim 34 wherein said database system establishes statistical control limits for particular engine parameters during various driving conditions.

42. The system for detecting abnormal behavior of claim 41 wherein the various driving conditions include idle, steady cruise at various speeds, and various rates of acceleration and deceleration.

43. The system for detecting abnormal behavior in claim 34 wherein said particular engine parameters comprise critical engine parameters.

* * * * *

UNITED STATES PATENT AND TRADEMARK OFFICE

CERTIFICATE OF CORRECTION

PATENT NO. : 6,836,708 B2
APPLICATION NO. : 10/275465
DATED : December 28, 2004
INVENTOR(S) : Pradeep R. Tripathi It is certified that error appears in the above-identified patent and that said Letters Patent is hereby corrected as shown below:

<u>Column 7:</u>
Line 4, Claim 1, “or” should be --of--.
Line 7, Claim 2, “parameter” should be --parameters--.
Line 18, Claim 5, “in” should be --an--.
Line 41, Claim 12, “or” should be --of--.
Line 50, Claim 13, “,” should be --;--.

<u>Column 8:</u>
Line 16-17, Claim 19, “perimeters” should be --parameters--.
Line 52, Claim 24, “dale” should be --data--.

<u>Column 9:</u>
Line 20, Claim 34, Insert --,-- after “module”.

Signed and Sealed this

Third Day of February, 2009

JOHN DOLL
*Acting Director of the United States Patent and Trademark Office*